United States Patent
Strauch et al.

(10) Patent No.: US 10,938,690 B2
(45) Date of Patent: Mar. 2, 2021

(54) DEVICES, SYSTEMS AND METHODS FOR WIRELESS COMMUNICATION SYSTEM EMPLOYING OVERLAPPING FREQUENCY BANDS

(71) Applicant: Cypress Semiconductor Corporation, San Jose, CA (US)

(72) Inventors: Paul Strauch, Pleasanton, CA (US); Ayush Sood, Bangalore (IN); Kiran Uln, San Jose, CA (US); Kamesh Medapalli, San Jose, CA (US); Prasanna Sethuraman, Bangalore (IN); Rajendra Kumar Gundu Rao, Bangalore (IN); Saishankar Nandagopalan, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/366,664

(22) Filed: Mar. 27, 2019

(65) Prior Publication Data

US 2020/0313988 A1    Oct. 1, 2020

(51) Int. Cl.
  *H04L 12/26* (2006.01)
  *H04W 76/10* (2018.01)
  *H04W 72/04* (2009.01)
  *H04W 88/08* (2009.01)
  *H04W 84/12* (2009.01)

(52) U.S. Cl.
  CPC ......... *H04L 43/08* (2013.01); *H04W 72/0453* (2013.01); *H04W 76/10* (2018.02); *H04W 84/12* (2013.01); *H04W 88/08* (2013.01)

(58) Field of Classification Search
  None
  See application file for complete search history.

(56) References Cited

U.S. PATENT DOCUMENTS

| | | | | |
|---|---|---|---|---|
| 6,091,765 A * | 7/2000 | Pietzold, III | ........... | H03G 3/345 375/219 |
| 6,292,654 B1 * | 9/2001 | Hessel | ................... | H03G 3/345 375/346 |
| 7,333,553 B2 * | 2/2008 | Chandrasekhar | .... | H04B 10/505 375/291 |
| 7,574,224 B2 * | 8/2009 | Lane | ..................... | H04L 5/0051 455/502 |
| 8,045,922 B2 * | 10/2011 | Sherman | ............... | H04W 16/14 370/328 |
| 8,179,873 B2 * | 5/2012 | Bonta | ..................... | H04W 4/20 370/338 |

(Continued)

OTHER PUBLICATIONS

International Search Report for International application No. PCT/US2020/014287 dated Feb. 25, 2020, 2 pages.

(Continued)

*Primary Examiner* — Gregory B Sefcheck

(57) ABSTRACT

According to embodiments, methods, devices and systems can include monitoring all of a first channel for a first monitoring period. After the first monitoring period, monitoring at least one narrow band for at least a first narrow band signal. In response to detecting the first narrow band signal, establishing a network connection over the narrow band, wherein the at least one narrow band has a frequency range less than one half that of the first channel.

22 Claims, 11 Drawing Sheets

(56) References Cited

U.S. PATENT DOCUMENTS

| | | | | |
|---|---|---|---|---|
| 8,315,201 B2* | 11/2012 | Cordeiro | ............ | H01Q 3/26 |
| | | | | 370/324 |
| 8,395,997 B2* | 3/2013 | Banerjea | ............ | H04W 72/04 |
| | | | | 370/241 |
| 8,687,560 B2* | 4/2014 | Sugar | ............ | H04W 4/023 |
| | | | | 370/328 |
| 8,885,499 B2* | 11/2014 | Ponnuswamy | ..... | H04W 72/082 |
| | | | | 370/252 |
| 9,357,570 B2* | 5/2016 | Kwon | ............ | H04W 76/10 |
| 9,433,011 B2* | 8/2016 | Hwang | ............ | H04W 72/1215 |
| 9,602,231 B2* | 3/2017 | van Houtum | ........ | H04J 11/0066 |
| 9,686,688 B2* | 6/2017 | Hedayat | ............ | H04W 16/14 |
| 9,999,069 B2* | 6/2018 | Nair | ............ | H04W 74/0816 |
| 10,149,209 B2* | 12/2018 | Lepp | ............ | H04W 72/1252 |
| 10,263,628 B2* | 4/2019 | Pagnanelli | ............ | H03L 7/191 |
| 10,362,573 B2* | 7/2019 | Halabian | ............ | H04W 72/0453 |
| 10,531,465 B2* | 1/2020 | Costa | ............ | H04W 72/046 |
| 2010/0091717 A1* | 4/2010 | Bonta | ............ | H04W 74/08 |
| | | | | 370/329 |
| 2015/0303741 A1* | 10/2015 | Malik | ............ | H04B 5/0037 |
| | | | | 307/104 |
| 2018/0234219 A1* | 8/2018 | Sridharan | ............ | H04B 7/2606 |
| 2019/0028141 A1* | 1/2019 | Padden | ............ | H04B 1/715 |

OTHER PUBLICATIONS

Written Opinion of the International Searching Authority for International application No. PCT/US2020/014287 dated Feb. 25, 2020, 5 pages.

\* cited by examiner

DEVICES, SYSTEMS AND METHODS FOR WIRELESS COMMUNICATION SYSTEM EMPLOYING OVERLAPPING FREQUENCY BANDS

TECHNICAL FIELD

The present disclosure relates generally to wireless networks, and more particularly to extending a range of a wireless network.

BACKGROUND

Conventional WLAN devices can establish communication connections over a number of channels, each occupying a different frequency range. In a conventional network, an access point (AP) can select channels in a static fashion or a dynamic fashion. In a conventional IEEE 802.111 wireless network, if a station device wants to send a data packet to an AP, the station can send a request-to-send (RTS) packet. The AP can reply with a clear-to-send (CTS) packet, After the CTS packet is sent, every station can update a timer and defer all transmissions until the timer reaches zero. This can ensure the channel remains free for packet transmission.

While wireless networks can connect large numbers of devices, various factors, including operating environment, network topology and/or transmission power, can limit the range of links between network devices. In particular, Internet-of-thing (IOT) devices may have a more limited range in connecting to an AP.

Any ability to extend a communication range in a wireless device could improve the performance of a wireless network and/or enable new applications for wireless networks.

DETAILED DESCRIPTION

Figure 1A:
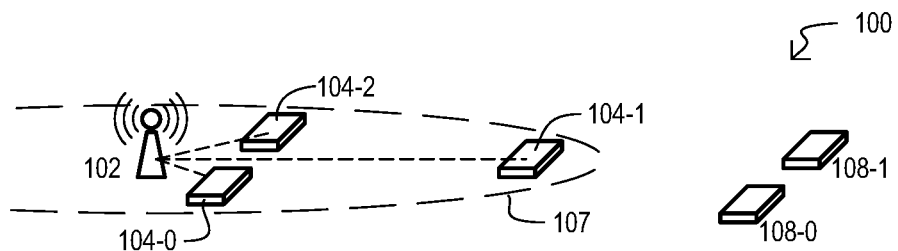
FIGS. 1A to 1D are diagrams of a system and operations according to embodiments.

According to embodiments, a station device can communicate with other devices according to a protocol that transmits across a first channel having a frequency range. In addition, the station device can monitor one or more narrow bands for a particular narrow band signal. If the particular narrow band signal is detected, the station device can establish a network connection over the narrow band. Transmissions over the narrow band can have a greater range than transmissions over the first channel.

In some embodiments, the station device can monitor the first channel, and then switch to monitoring the narrow bands if no signals are detected on the first channel.

In some embodiments, an access point device (AP) or a station device can transmit a clear signal which can prevent other devices from transmitting across the first channel, Subsequently, the AP or station device can transmit across a narrow band. In some embodiments, the narrow band can be a portion of the first channel.

In the various embodiments below, like items are referred to by the same reference characters, but with the leading digit(s) corresponding to the figure number.

FIGS. 1A to 1D are a sequence of block diagrams of a system 100 and operations according to embodiments. A system 100 can include an AP 102, first station devices 104-0 to 104-2, and second station devices 108-0/1. An AP 102 can connect various station devices (104-0 to -2, 108-0/1) in a network. While devices are referred to as APs and station devices, this should not be construed as implying any particular network topology or communication protocol.

Referring to FIG. 1A, AP 102 can communicate via a first protocol by transmitting across one or more channels. Such channels can encompass a set range of frequencies. Transmissions on channels can have a range 107. Thus, first station devices (104-0 to -2) are within range 107 of transmissions over channels, while second station devices (108-0/1) are beyond range 107. In some embodiments, a first protocol can be an IEEE 802.11 wireless protocol.

Figure 1B:
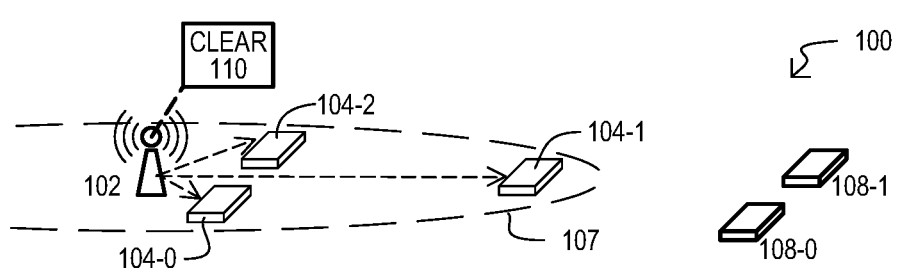

Referring to FIG. 1B, AP 102 can transmit a "clear" signal 110. A clear signal 110 can direct devices within range 107 to refrain from transmitting across one or more channels. In response to a clear signal, first station devices (104-0 to -2) can cease any transmissions across the indicated band(s). Second station device (108-0/1) can be beyond the range 107 of a clear signal 110. In some embodiments, a clear signal 110 can be a clear-to-transmit-to-self (CTS-to-self) type signal.

Figure 1C:
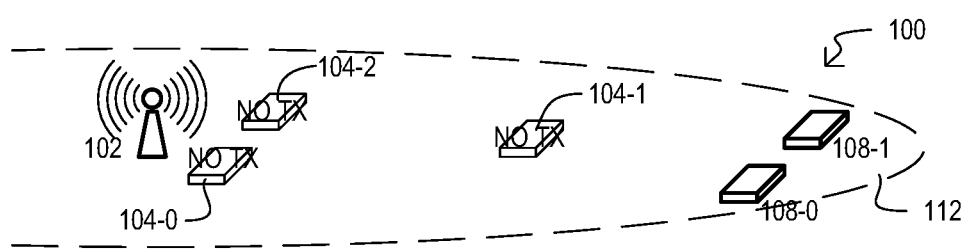

Referring to FIG. 1C, first station devices (104-0 to -2) can cease transmitting over one or more channels indicated by the clear signal 110. Such an action can help ensure a narrow band signal can be transmitted with less chance of interference. AP 102 can then communicate via a second protocol using one or more narrow bands. AP 102 can discover and create a connection to second devices 108-0/1. Narrow bands can have a smaller frequency range than channels. Further, in some embodiments, narrow bands can occupy a portion of the channel(s) inhibited by the clear signal 110.

Transmissions across narrow bands can have a second range 112 that is greater than first range 107. Such a larger range can be achieved in any suitable manner, including increased power spectral density (PSD) and/or repeated or extended symbol transmission. In some embodiments, a second protocol can be a proprietary protocol that is not part of any IEEE 802.11 wireless standard.

Figure 1D:
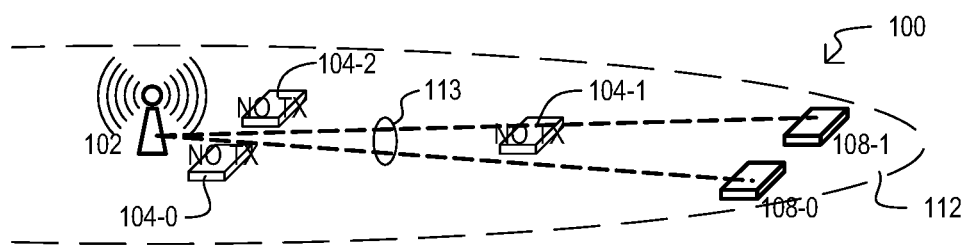

Referring to FIG. 1D, AP 102 and second station devices 108-0/1 can communicate with one another via connections 113 which can extend beyond first range 107. In this way, devices can communicate with an AP at larger ranges than conventional systems. In some embodiments, a system 100 can switch between lower range first protocol (e.g. FIG. 1B) and larger range second protocol (e.g., FIG. 1D).

In some embodiments, signals transmitted over channel(s) and narrow bands can have a same type of modulation. Such modulation can be a spread spectrum type modulation, and in particular embodiments, can be a direct-sequence spread spectrum type modulation.

Figure 2:
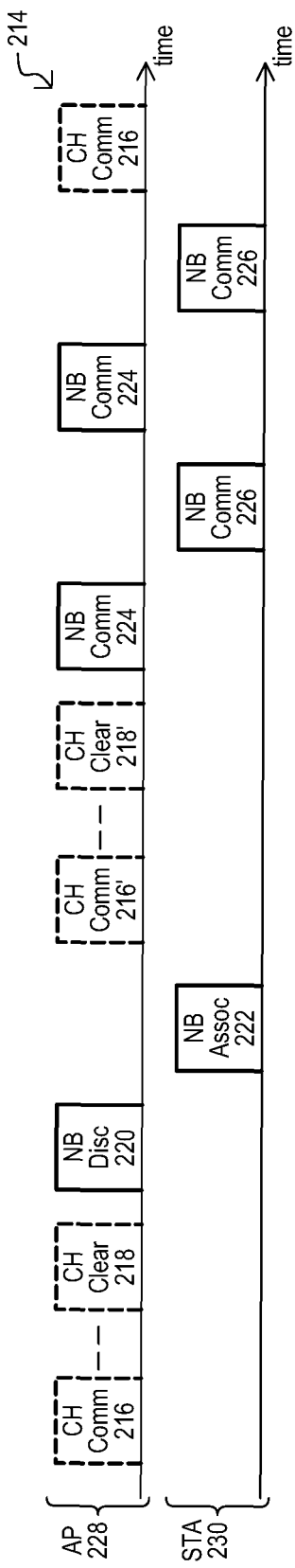
FIG. 2 is a timing diagram of a system operation according to an embodiment.

Referring to FIG. 2, a transmission method according to an embodiment is shown in a timing diagram 214. Timing diagram 214 includes signals for an AP 228 and a station device (STA) 230. In some embodiments, AP signals 228 can correspond to AP 102 and STA signals 230 can correspond to second station devices 108-0/1 as shown in FIGS. 1A to 1D.

AP 228 can communicate over one of more channels (CHs) 216. Such communications can have a first range. AP can then transmit a clear signal 218. A clear signal 218 can result in devices within the first range ceasing any transmissions across one or more channels, STA 230 can be beyond such a first range, and thus may not detect transmissions 216 or 218.

Following clear signal 218, AP 228 can transmit a discover signal 220 over one or more narrow bands, Such transmissions can have a second range greater than the first range. A discovery signal 220 can indicate to devices within the second range that the AP 228 can communicate according to a second protocol over the one or more narrow bands.

STA 230 can detect discover signal 220, and in response transmit one or more association signals 222 over the one or more narrow bands, Association signals 222 can be detected by AP 228, and in some embodiments can include a hand shaking operation between AP 228 and STA 230 to establish communication parameters.

AP 228 can then return to transmissions over one or more channels 216'. Subsequently, AP 228 can issue another clear signal 218', AP 228 and STA 230 can communicate 224/226 over the one or more narrow bands. In some embodiments, AP 228 can issue clear signals 218 and enter a narrow band transmission mode at predetermined intervals once STA 230 is detected. Such an interval can be established in an association handshake (e.g., 222), as but one example.

Figure 3:
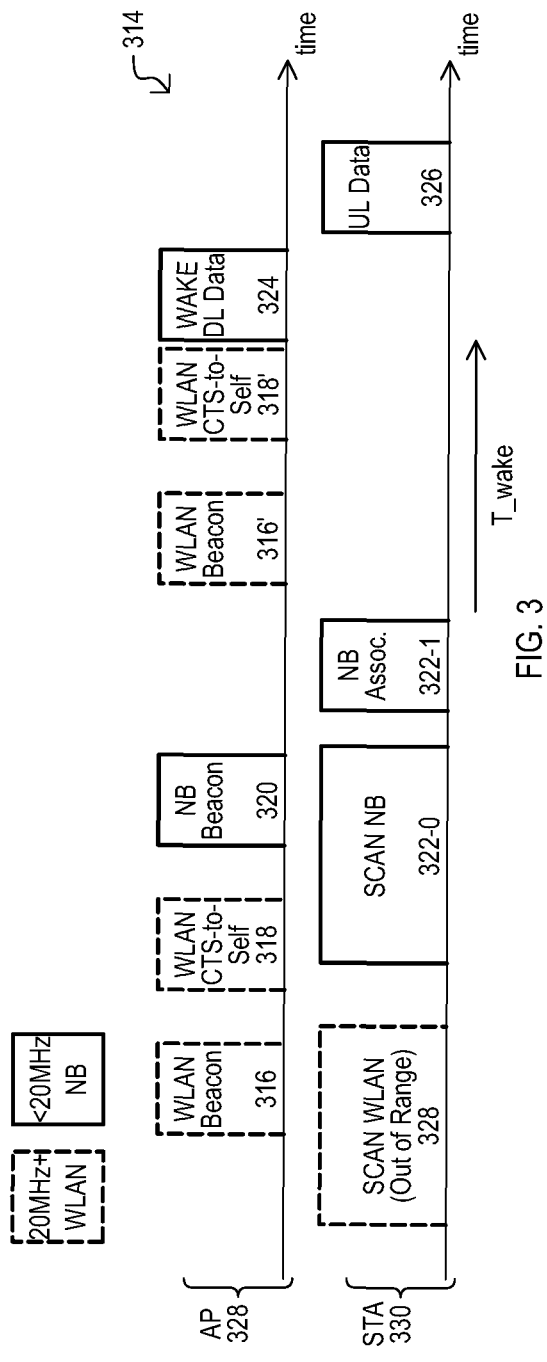
FIG. 3 is a timing diagram of a system operation according to another embodiment.

Referring to FIG. 3, a transmission method according to another embodiment is shown in a timing diagram 314. Timing diagram 314 includes signals for an AP 328 and a STA 330. In some embodiments, AP signals 328 can correspond to AP 102 and STA signals 330 can correspond to second station devices 108-0/1 as shown in FIGS. 1A to 1D. In FIG. 3, transmissions over a channel are shown by dashed lines, and can be transmissions within a band having a width of about 20 MHz or greater. Transmissions over a narrow band are shown by solid lines and can be transmissions within a narrow band having a bandwidth of less than 20 MHz. Further, channel transmissions can be according to a wireless standard networking (WLAN) protocol.

STA 330 can scan a channel for signals 328. While STA 330 is scanning a channel, AP can transmit a WLAN beacon 316. A WLAN beacon 316 can signal the presence of the AP according to the WLAN standard. However, STA 330 can be out of range, thus its scanning 328 does not detect the WLAN beacon 316, After STA 300 does not sense any signal on channels, it can switch to scanning one or more narrow bands 322-0.

According to predetermined criteria, AP 328 can issue a WLAN CTS-to-self message 318. Such a message can clear communications over one or more channels which could potentially interfere with an intended narrow band. Having cleared the channel(s), AP 328 can issue a beacon on a narrow band 320. Narrow band beacon 320 can signal the presence of the AP operating according to a narrow band communication standard that is different than the WLAN standard. In some embodiments, a narrow band communication standard can be a proprietary standard.

While STA 330 monitors a narrow band 322-0, it can detect narrow band beacon 320. In response, STA 330 can execute a narrow band association operation 322-1. A narrow band association operation 322-1 can result in STA 322-0 establishing a communication connection with AP 328, A narrow band association operation 322-1 can take any suitable form, including but not limited to, as little as the STA 322-0 transmitting data to the AP 328, or a multiple transmission negotiation between AP 328 and STA 330. In the embodiment shown, association 322-1 can result in AP 328 and STA 330 establishing a wake time (T_wake), at which communications over narrow bands can resume.

Following association 322-1, AP 328 can resume communications over channel(s) 316'. However, upon approaching the established wake time, AP 328 can once again clear channel(s) with a CTS-to-self signal 318'. At the established wake time (T_wake), AP 328 can transmit downlink (DL) data 324 with transmissions across the narrowband(s), and according to an operation/application, STA 330 can transmit uplink (UL) data 326 with transmissions across the narrowband(s).

Operations can continue with AP 328 switching between a WLAN (e.g., lower range) mode and a narrow band (e.g., higher and/or more robust) mode.

Figure 4:
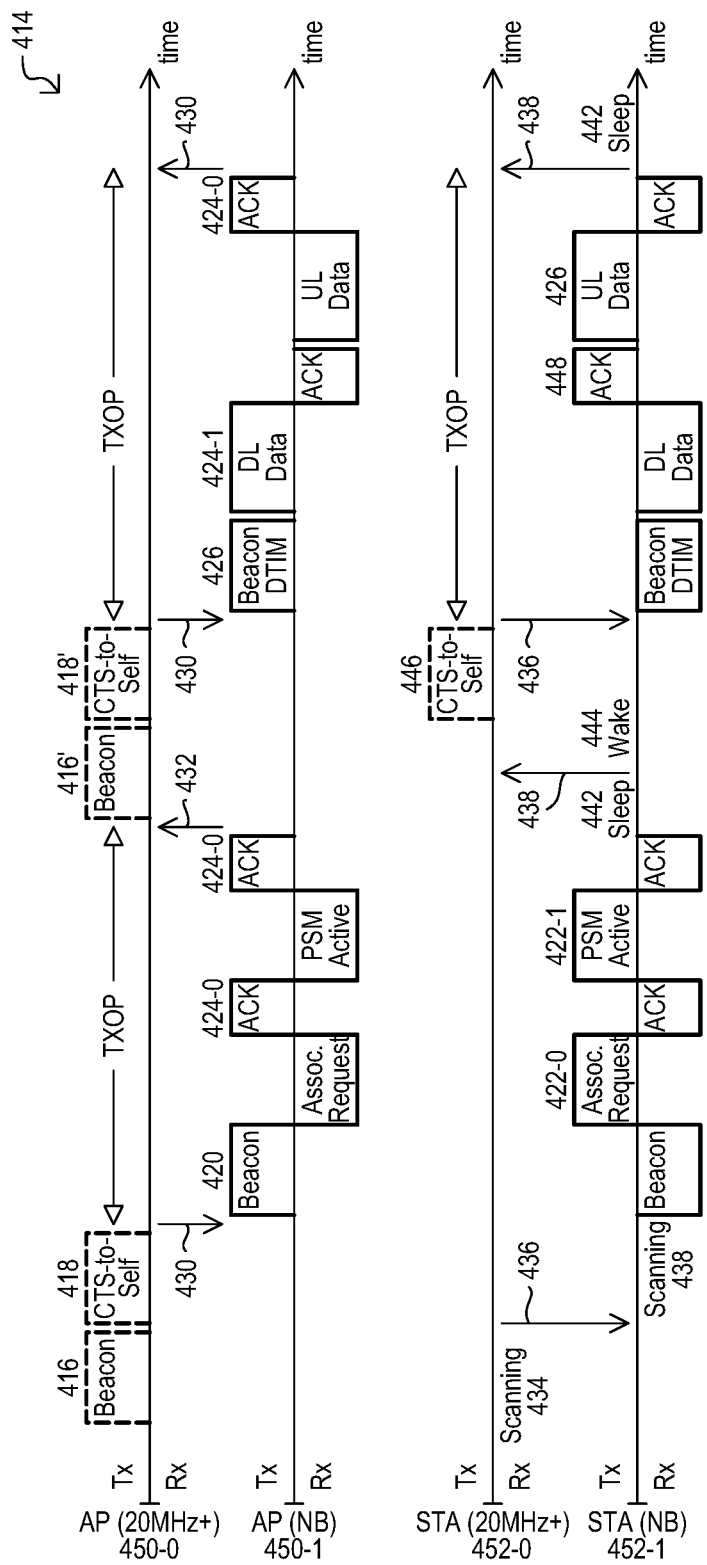
FIG. 4 is a timing diagram of a system operation according to another embodiment.

FIG. 4 is a timing diagram 414 showing operations according to a further embodiment. FIG. 4 shows operations for an AP and a STA. AP operations are divided between a channel mode 450-0, which can transmit in a channel having a frequency range of at least 20 MHz, and a narrow band mode 450-1, having a frequency range less than 20 MHz, for example, any or all of 10 MHz, 5 MHz or 2 MHz. Similarly, STA operations are divided between the channel mode 452-0 and the narrow band mode 452-1. The various operations 450-0/1, 452-0/1 also show both receive operations (RX) and transmit operations (TX).

Referring to FIG. 4, STA can scan a channel for signals 434, At this time, AP can issue a channel beacon 416. However, because STA is out of range, it cannot detect or accurately decode the channel beacon 416. A STA can then make a bandwidth switch 436, switching from a channel to one or more narrow bands. STA can then scan one or more narrow bands 438 for narrow band signals. AP can issue a CTS-to-self 418, which can clear a channel of transmissions.

After a CTS-to-self 418, AP can make a bandwidth switch 430 to a narrow band mode and issue a narrow band beacon 420, STA can detect the narrow band beacon 420, and in response, issue an association request 422-0. AP can acknowledge 424-0 the association request. In the embodiment shown, an STA can indicate it is in a power save mode 422-1, which can let the AP know when it will wake and monitor for future narrow band transmissions. AP can acknowledge 424-0 such data. In the embodiment shown, an agreed wake time can be a delivery traffic indication map (DTIM) interval, but could be any suitable timing parameter, including a proprietary timing parameter.

According to some embodiments, AP and STA can be configured to communicate over narrow band(s) during a transmit opportunity period (TXOP). A TXOP can be established by a CTS-to-self 418 message. However, time periods such as TXOP or a substitute for the DTIM interval can be established in any other suitable manner, including but not limited to: being programmed into both devices (AP and STA) by a manufacturer, set by a user, or received from another device, including from AP to STA and/or STA to AP.

Having associated with the AP the TXOP period can expire, and STA can enter a sleep mode 442. In the embodiment shown, STA can make a bandwidth switch 438 back to channel mode. On the AP side, the AP can make a bandwidth switch 432 back to channel mode and issue a channel beacon 416'. AP can then communicate over the channel(s) with other devices, if such other devices are present.

Before or at the end of the DTIM interval, AP can issue another CTS-to-self message 418', then make a bandwidth switch 430 to narrow band mode. At about the same time, STA can wake 444 and issue its own CTS-to-self message 446, which can indicate to devices that may be out of range of AP, to clear a corresponding channel. STA can then make a bandwidth switch 436 back to narrow band mode.

Once AP and STA have returned to narrow band mode, AP can issue a narrow band beacon 426 (according to predetermined timing, which in this case is a DTIM interval). Such a beacon can be detected by STA, which then can prepare for DL data, AP can transmit DL data 424-1, which can be received and acknowledged 448 by STA. STA can then transmit UL data 426, which can be received and acknowledged 424-0 by AP. At the end of the TXOP, STA can make a bandwidth switch 438 back to channel mode and return to a sleep mode 442, while AP can also make bandwidth switch back to channel mode 432. Of course, any other suitable operation can occur between STA and AP, including no operations if there is no need to transmit data between the two devices.

In some embodiments, a channel mode can include communications according to an IEEE 802.11 wireless standard. A corresponding narrow band can be a portion of the channel used in the 802.11 standard. In a particular embodiment, a channel mode can include the IEEE 802.11ax or similar standard, and a narrow band mode can utilize one or more RUs indicated by the IEEE 802.11ax standard.

Figures 5, 6A:
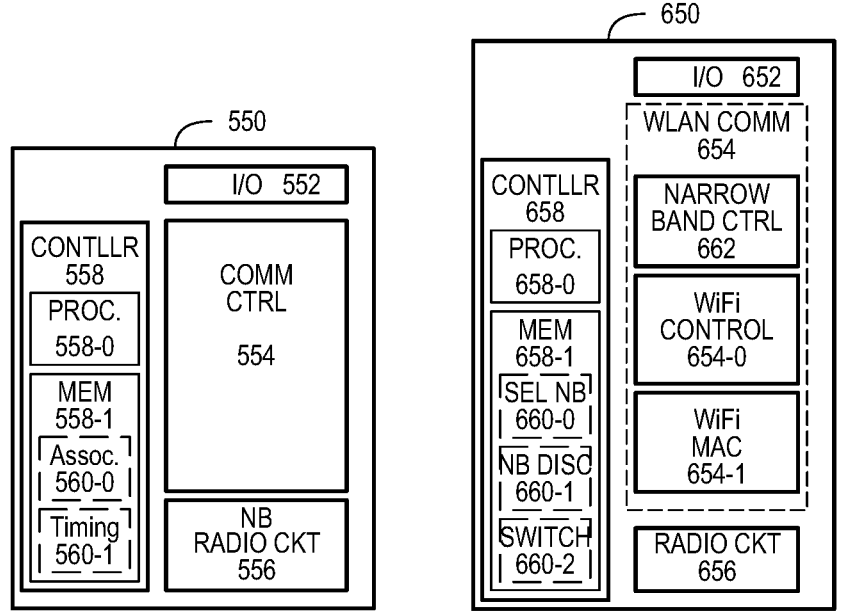
FIG. 5 is a block diagram of a device according to an embodiment.
FIGS. 6A and 6B are block diagrams of combination devices according to embodiments.

FIG. 5 is a block diagram of a device 550 according to an embodiment. In some embodiments, device 550 can be one particular implementation of a station device like that shown as 108-0/1 in FIGS. 1A to 1D. Device 550 can operate in a narrow band mode, but not a channel mode, A device 550 can include communication circuits 554, controller 558, radio circuits 556, and input/output (I/O) circuits 552. Communication circuits 554 enable operations in any of various narrow bands. Narrow bands can have a frequency range of less than 20 MHz. In some embodiments, narrow bands can correspond to RUs of the IEEE 802.11ax standard, or an equivalent standard that can divide channels into smaller sub-bands, Unlike some conventional approaches, communication circuits 554 can enable transmissions over narrow bands without a full channel preamble. Radio circuits 556 can include circuits for receiving and transmitting signals according to at least one protocol over one or more narrow bands.

A controller 558 can control transmissions by communication circuits 554. In some embodiments, a controller 558 can include circuits (or instructions executable by circuits) for associating with an access point device 560-0 over a narrow band, as well as instructions/circuits for establishing timing for communications over narrow band(s) 560-1 (e.g., TXOP, DTIM interval).

In some embodiments, device 550 can be an integrated circuit device, with the various portions being included in one integrated circuit package or formed in a same integrated circuit substrate.

FIG. 6A is a block diagram of a device 650 according to another embodiment. A device 630 can be one particular implementation of an AP or STA like those shown as 102 and 108-0/1 in FIGS. 1A to 1D, Device 650 can switch between a channel mode and a narrow band mode. A device 650 can include communication circuits 654, controller 658, radio circuits 656, and input/output (I/O) circuits 652, Communication circuits 654 can include WLAN circuits, including a WiFi control circuit 654-0 and WiFi media access control (MAC) circuits 654-1. WLAN circuits can operate in any suitable band, including a 2.4 GHz band, 5.0 GHz band and/or 6.0 GHz band. In some embodiments, WLAN circuits can be compatible with a wireless IEEE 802.11 standard. In addition, communication circuits 654 can also include narrow band control circuits 662. Narrow band control circuits 662 can enable device to communicate in one or more narrow bands, which can be portions of a channel used by WLAN circuits, Communication circuits 654 can enable transmission over narrow bands without a full channel preamble (e.g., a preamble transmitted across the frequencies of the channel).

Radio circuits 656 can include circuits for receiving and transmitting signals according to at least two different protocols. Radio circuits can include any suitable circuits according to a selected protocol, and in some embodiments can include physical interface (PHY) circuits and baseband circuits. In some embodiments, radio circuits 656 can transmit/receive on any internationally recognized industrial, scientific, or medical (ISM) band, as wells portions of such bands.

A controller 658 can control transmissions by communication circuits 654, In some embodiments, a controller 658 can include circuits (or instructions executable by circuits) for determining and/or selecting a narrow band for transmission 660-0, discovering/associating with devices with narrow bands 660-1, and/or switching between channel and narrow band modes 660-2, as described in various embodiments herein, and equivalents. In the embodiment shown, a controller 658 can include a processor section 658-0 and a memory section 658-1.

I/O circuits 652 can enable control of device 630 by another system or device. I/O circuits 652 can include circuits that enable communication with the device according to any suitable method, including any of various serial data communication standards/methods including but not limited to: serial digital interface (SDI), universal serial bus (USB), universal asynchronous receiver transmitter (UART), $I^2C$, or VS.

Figure 6B:
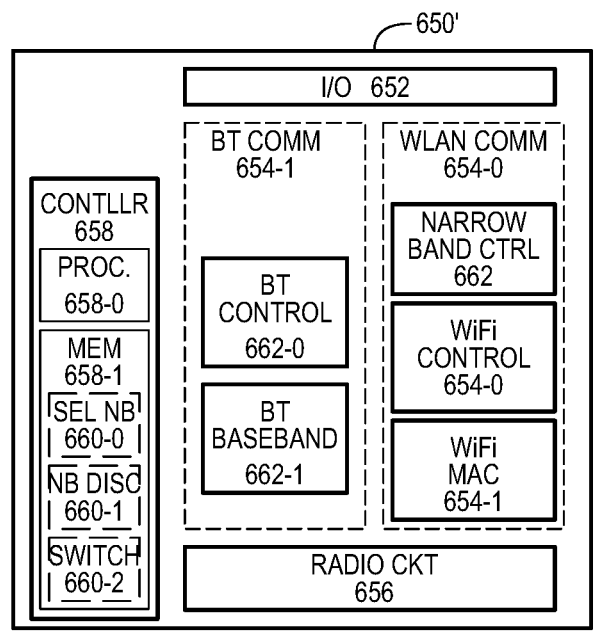

In some embodiments, device 650 can be an integrated circuit device, as described herein, FIG. 6B is a block diagram of a combination device 650' according to an embodiment. A combination device 650' can include wireless circuits for operating in a WLAN mode, a narrow band mode, and a Bluetooth (BT) mode. Combination device 650' can include sections like those shown in FIG. 6A, including first communication circuits 654-0, which can correspond to WLAN circuits shown as 654 in FIG. 6A. Other like sections are referred to by the same reference characters.

In addition, combination device 650' can include second communication circuits 654-1, Second communication circuits 654-1 can be BT circuits including BT control circuits 662-0 and BT baseband circuits 662-1. BT circuits can operate in a 2.4 GHz band according to a BT standard.

In some embodiments, device 650' can be an integrated circuit device, as described herein.

Figure 7A:
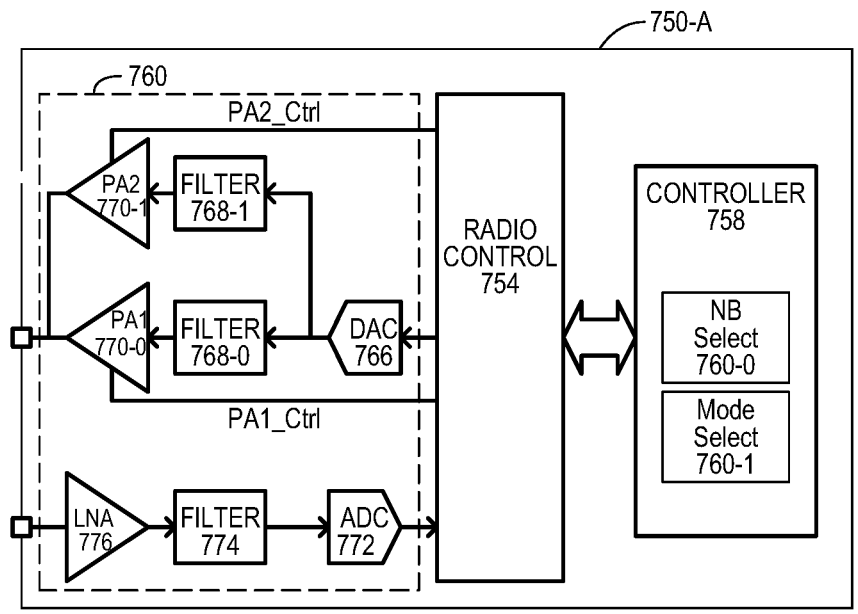
FIGS. 7A and 7B are block diagrams of devices that can transmit with different power spectral densities.
Figure 7B:
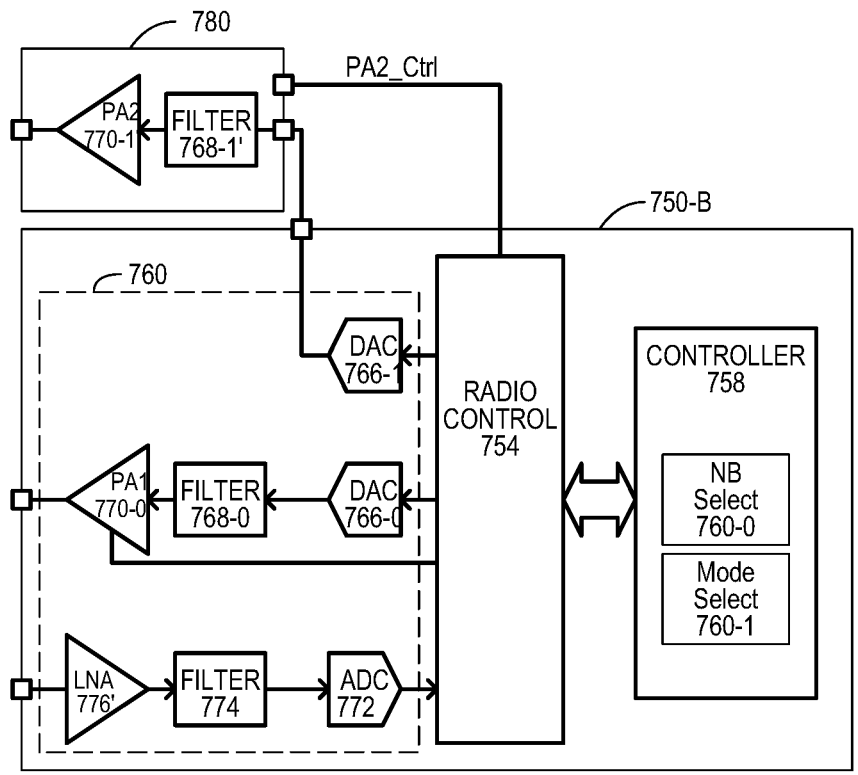

FIGS. 7A and 7B are diagrams showing devices according to additional embodiments. The embodiments show devices which can include power amplifier circuits for increasing the power (e.g., PSD) of narrow band transmissions as opposed to other transmission in channels (e.g., wider frequency bandwidth than narrow band).

Referring to FIG. 7A, a device 750-A having built-in dual power transmission capability is shown in a block schematic diagram, A device 750-A can include a controller section 758, radio control circuits 754 and an amplifier section 760. A controller section 758 can control operations of a device 750-A, including selecting narrow bands 760-0 for transmission, as well as particular modes of operation 760-1. Mode select 760-1 can include selecting between different discovery modes as described herein, and equivalents (e.g., discovering any or all station devices using a standard band, then switching to narrow bands to extend a discovery/communication range).

Radio control circuits 754 can control radio operations, including transmitting over narrow bands and channels as described herein and equivalents.

Amplifier section 760 can include a digital-to-analog converter (DAC) 766, first filter 768-0, second filter 768-1, first PA 770-0, second PA 770-1, LNA 776, filter 774 and analog-to-digital converter (ADC) 772. In some embodiments, transmissions over a channel can occur via DAC 766, filter 768-0 and PA 768-0, and can have a first PSD limit. Transmission over narrow bands can occur via DAC 766, filter 768-1, and PA 768-1, and can have a second PSD limit that is greater than a first PSD limit. PAs 768-0/1 can be controlled by PA control signals PA1_Ctrl and PA2_Ctrl, respectively.

In some embodiments, device 750-A can be an integrated circuit device, as described herein.

Referring to FIG. 7B, a device 750-B having an additional, external power amplifier is shown in a block schematic diagram. A device 750-B can include features like those of FIG. 7A, and such like features are shown in the same reference characters.

FIG. 7B differs from FIG. 7A in that it can include one DAC 766-0 for transmissions over channels and another DAC 766-1 for higher power transmissions over narrow bands. FIG. 7B also differs from FIG. 7A in that device 750-B can connect to amplifier device 780, which can include a PA 770-1' and filter 768-1'. PA 770-1' and filter 768-1' can transmit signals on narrow bands at a higher maximum power (PSD) than those transmitted by PA 770-0 on device 750-B. Control signals PA2_Ctrl can be provided to power device 780 from device 750-B.

In some embodiments, device 750-B can be an integrated circuit device, as described herein, and amplifier device 780 can be a separate integrated circuit device, which may or may not be included in the same integrated circuit package as device 750-B.

Figure 8:
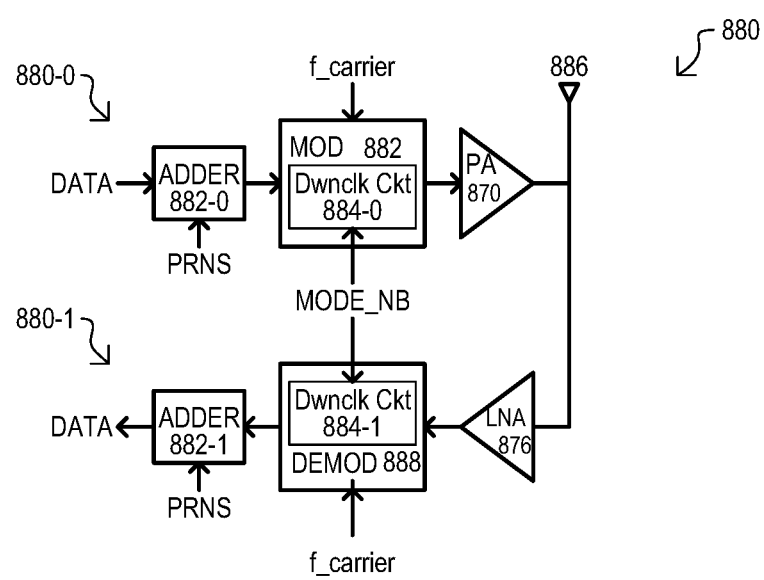
FIG. 8 is a diagram of modulation circuits that can be included in embodiments.

FIG. 8 shows an example of modulation/demodulation circuits 880 that can be included in embodiments. Circuits 880 can switch modulation operations to generate channel and narrow band signals. Circuits 880 can include a transmission portion 880-0 and a reception portion 880-1. Transmission portion 880-0 can include an adder 882-0, modulator 882 and PA 870. Adder 882-0 can encode a data value according to pseudorandom number sequence (PRNS). Modulator 882 can modulate a data stream provided by adder 882-0 into a spread band spectrum. Modulator 882 can receive a carrier frequency (f_carrier), as well as a narrow band mode control signal MODE_NB. Modulator 882 can include a downclock circuit 884-0 which can be controlled by signal MODE_NB to be enabled in a narrow band mode and disabled in a channel mode. A PA 870 can amplify a signal for transmission over antenna 886. In some embodiments, PA 870 can transmit at a higher power (e.g., PSD) in a narrow band mode as compared to a channel mode.

Reception portion 880-1 can include a low noise amplifier 876, demodulator 888, and adder 882-1. LNA 876 can amplify signal for received over antenna 886. Demodulator 888 can demodulate a signal received from LNA 876. Demodulator 888 can receive the carrier frequency (f_carrier), as well as the signal MODE_NB. Demodulator 888 can include a downclock circuit 884-1 which can be enabled by MODE_NB in a narrow band mode and disabled in a channel mode, Adder 882-1 can decode a data value with the same PRNS used to encode the data value.

In some embodiments, modulation/demodulation circuits 880 can use a same modulation for both channel and narrow band modes. In particular, DSSS modulation can be used for both channel and narrow band transmissions.

Figure 9:
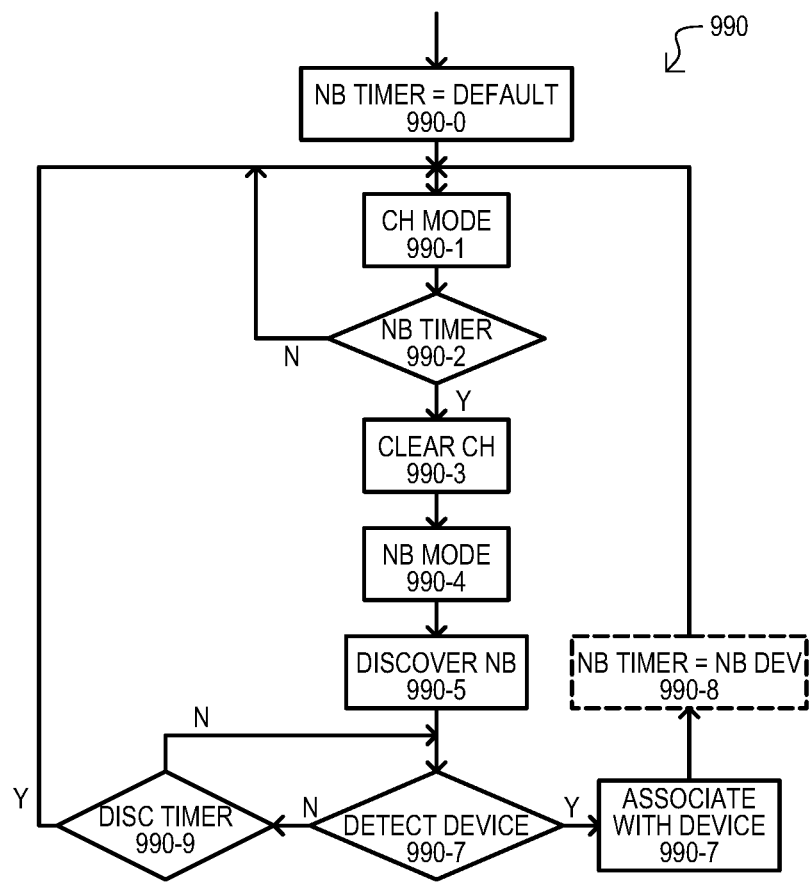
FIG. 9 is a flow diagram of an access point device (AP) method according to an embodiment.

FIG. 9 is a flow diagram of method 990 according to an embodiment, A method 990 can be executed by a device, such as an AP or the like, such as that shown as 102 in FIGS. 1A to 1D. A method 990 can include a narrow band (NB) timer value set to a default value 990-0. An NB timer value can determine when an AP can switch from a channel mode to a narrow band mode, An AP can operate in a channel (CH) mode 990-1, In a channel mode, an AP can communicate by transmitting across one or more channels according to a first protocol. While an NB timer continues to run (N from 990-2), the AP can continue to operate in the CH mode.

When NB timer is complete (Y from 990-2), AP can issue a clear CH signal 990-3. Such an action can result in other devices operating over the channel(s) ceasing transmissions on the channel(s). An AP can then enter a narrow band mode 990-4. In a narrow band mode, the AP can transmit and receive over one or more narrow bands, where the narrow bands have smaller frequency ranges than the channel(s).

Once in the narrow band mode, an AP can execute a narrow band discovery operation 990-5. In such an operation, an AP device can transmit signals over one or more narrow bands to indicate to other devices it is available. If a device is detected (Y from 990-6) (e.g., a device responds over a narrow band), an AP can associate with the device 990-7. Such an action can include the other device sending, receiving, or exchanging information with the AP to establish a connection to the AP over the narrow band(s). Optionally, once another device is associated with the AP, the AP can adjust a NB timer value (990-8). The AP can then return the CH mode 990-1.

If the AP fails to discover another device over the narrow bands (N from 990-6) after a discovery time period (N from 990-9), a method can return to the CH mode 990-1.

Figure 10:
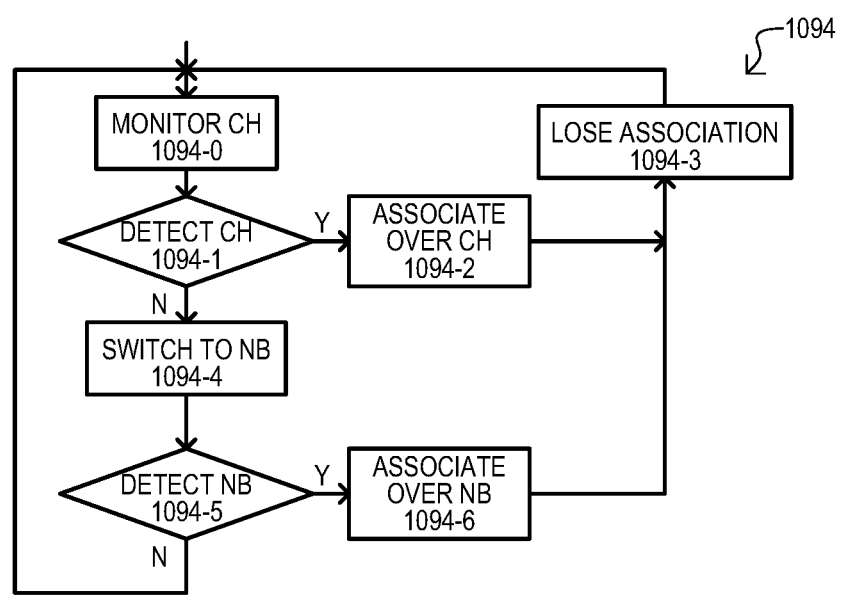
FIG. 10 is a flow diagram of a station device (STA) method according to another embodiment.

FIG. 10 is a flow diagram of method 1094 according to another embodiment. A method 1094 can be executed by a device, such as a station device, or the like (e.g., 108-0/1 in FIGS. 1A to 1D). A method 1094 can include monitoring one or more channels 1094-0. Such an action can include a device monitoring channel(s) according to a predetermined protocol. If a channel signal is detected (Y from 1094-1), a method 1094 can associate with another device (e.g., AP) over the channel(s) 1094-2. Operations can then continue with transmissions occurring over the channel(s) according to the predetermined protocol.

If a channel signal is not detected (N from 1094-1), a method 1094 can switch to a narrow band mode (1094-4). Such an action can include configuring communication circuits to receive and transmit over one or more narrow bands. Narrow bands can have a smaller frequency than channels, and in some embodiments, can be portions of a channel. A method 1094 can monitor one or more narrow bands 1094-4. Such an action can include a device monitoring one or more narrow bands according to protocol different than that used to monitor the channels. If a narrow band signal is detected (Y from 1094-5), a method 1094 can associate with another device (e.g., AP) over a narrow band. Operations can then continue with transmissions occurring over the narrow band 1094-6. If a narrow band signal is not detected, a method 1094 can return to monitoring a channel 1094-0.

In the embodiment shown, if an association is lost 1094-3, a method can return to 1094-0.

It is noted that in other embodiments, a STA can switch from a channel mode to a narrow band mode in response to events other than failing to detect a channel signal. For example, a STA can switch from a channel mode to a narrow band mode upon detecting a narrow band signal, in response to a command, or in response to a condition (power, data rate, etc.). Further, in other embodiments, a STA can startup in a narrow band mode, and switch to a channel mode in response to various conditions.

Figure 11:
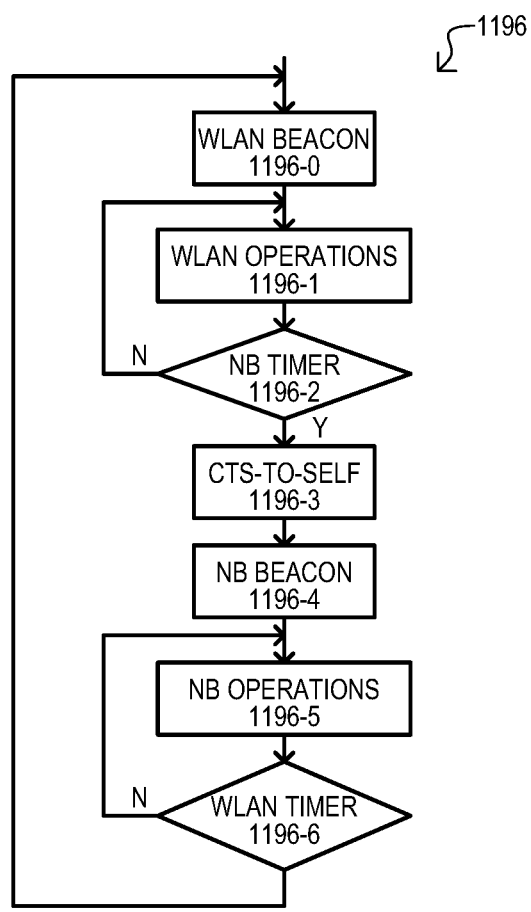
FIG. 11 is a flow diagram of an AP method according to an embodiment.

FIG. 11 is a flow diagram of a method 1196 according to another embodiment. A method 1196 can be executed by a device, such as an AP or the like. A method 1196 can be executed by a device that can operate according to a WLAN specification, as well as a narrow band mode of operation.

Referring to FIG. 11, a method 1196 include transmitting a WLAN beacon 1196-0. Such an action can include transmitting a beacon according to predetermined protocol. In some embodiments, a protocol can be an IEEE 802.11 wireless protocol. A method 1196 can then enter a WLAN mode of operation 1196-1. Such an action can include a station devices discovering and associating with any suitable station devices found within range of the WLAN transmissions. Such operations can continue while a switch to narrow band timer counts (N from 1196-2). A switch to narrow band timer 1196-2 can operate according to any suitable timing method available by the protocol, and in some embodiments can be based on a delivery traffic indication map (DTIM) interval.

Once a switch to narrow band timer limit is reached (Y from 1196-2), a method 1196 can transmit a CTS-to-self signal 1196-3, which can clear transmissions from other devices over one or more of the WLAN channels. In some embodiments, this can be a CTS-to-self packet according to an IEEE 802.11 wireless standard.

Following a CTS-to-self 1196-3, a method 1196 can issue a narrow band beacon 1196-4. Such an action can include transmitting a packet across a narrow band, and not across any WLAN channel. In some embodiments, a narrow band beacon (and other narrow band transmissions) can have a greater range than WLAN transmissions. Consequently, a narrow band beacon can discover station devices outside of the range of a WLAN beacon 1196-0. In some embodiments, narrow bands can be portions of channels used in an IEEE 802.11 wireless standard. In particular embodiments, narrow bands can be RUs as indicated in the IEEE 802.11ax standard or an equivalent.

A method 1196 can then enter a narrow band mode of operation 1196-5. Such an action can include an AP discovering and associating with any suitable station devices found within range of the narrow band transmissions. Such operations can continue while a switch to WLAN timer counts (N from 1196-6). A switch to WLAN timer 1196-6 can operate according to any suitable timing method. In some embodiments such a timing can be based on a CTS-to-self transmission.

Once a switch to WLAN timer limit is reached (Y from 1196-6), a method 1196 can return to 1196-0 (e.g., WLAN operations).

Figure 12:
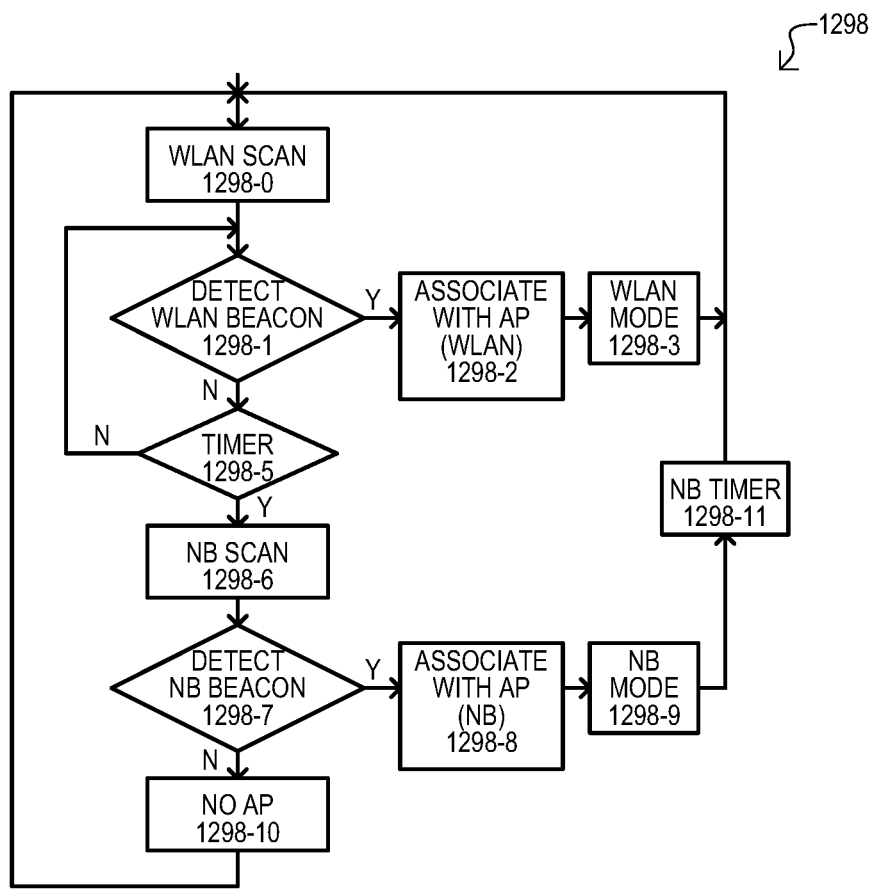
FIG. 12 is a flow diagram of a STA method according to another embodiment.

FIG. 12 is a flow diagram of method 1298 according to a further embodiment. A method 1298 can be executed by a device, such as a station device, or the like, A method 1298 can include WLAN scanning 1298-0. Such an action can include scanning one or more WLAN channels for transmissions (e.g., WLAN beacons) according to a wireless standard. In some embodiments, a standard can be an IEEE 802.11 wireless protocol. If a WLAN beacon is detected (Y from 1298-1), a method 1298 can associate with an AP issuing the beacon 1298-2. Such an action can include executing a hand shaking operation according to the WLAN protocol. A WLAN mode can then be entered 1298-3, and a device can communicate with an AP according to the WLAN protocol.

If a WLAN beacon is not detected (N from 1298-1) after a predetermined time period (Y from 1298-5), a method 1296 can perform narrow band scanning 1298-6, Such an action can include scanning one or more narrow bands for transmissions (e.g., narrow band beacon). It is understood that such operations do not scan for channel signals (e.g., preambles), but rather signals limited to the narrow band. In some embodiments, narrow bands can be portions of channels used in an IEEE 802.11 wireless standard. In particular embodiments, narrow band can be RUs as indicated in the IEEE 802.11ax standard or an equivalent.

If a narrow band beacon is detected (Y from 1298-7), a method 1298 can associate with an AP issuing the narrow band beacon 1298-8. Such an action can include executing a hand shaking operation according to a proprietary protocol, A narrow band mode can then be entered 1289-9. If a narrow beacon is not detected (N from 1298-7), no access point can be found 1298-10, and a method 1298 can return to 1298-0.

Once in a narrow band mode 1298-9, after a timer period 1298-11, a method 1298 can switch to a WLAN mode 1298-0.

As in the case of FIG. 10, in other embodiments, a method can switch between a WLAN mode and narrow band in response to various other conditions. Further, a method can start in a narrow band mode and then switch to a WLAN mode.

Figure 13:
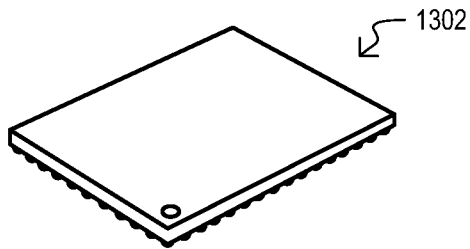
FIG. 13 is a diagram of a device according to another embodiment.

While embodiments can include systems with various interconnected components, embodiments can also include unitary devices which can selectively switch from communicating or attempting communications across one or more channels, then switching to a number of narrow bands, as described herein or equivalents. In some embodiments, such unitary devices can be advantageously compact single integrated circuits (i.e., chips). FIG. 13 shows one particular example of a packaged single chip device 1302. However, it is understood that a device according to embodiments can include any other suitable integrated circuit packaging type, as well as direct bonding of a device chip onto a circuit board or substrate.

Figure 14:
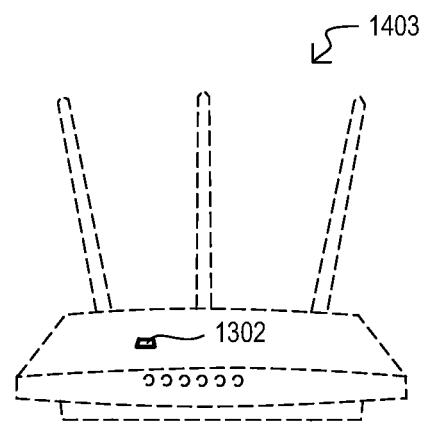
FIG. 14 is a diagram of a system according to another embodiment.

Referring to FIG. 14, another system according to an embodiment is shown in a diagram. A system can include a router device 1403. Router device 1403 can provide routing functions for a first protocol (e.g., WLAN) while also enabling a second, extended range protocol, which can utilize narrower bands than the first protocol. Such functions can include issuing clear signals to clear one or more channels which have the potential to interfere with an anticipated narrow band(s). In some embodiments, router device 1403 can include a device like that shown in FIG. 13.

Figure 15:
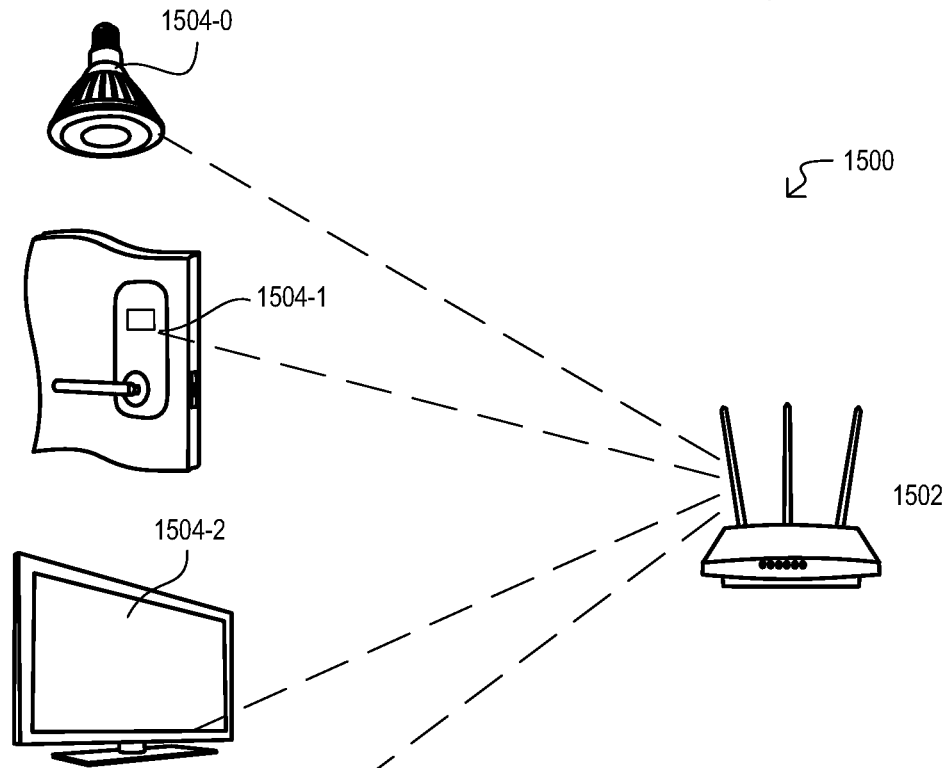
FIG. 15 is a diagram of a system according to another embodiment.

FIG. 15 shows a system 1500 according to another embodiment. A system 1500 can include various local devices 1504-0 to -3 and a gateway device 1502, Local devices (1504-0 to -3) can include various devices, which can operate as station devices. In the embodiment shown, local devices can be Internet-of-things (IOT) type devices, such as home automation devices, including lighting devices 1504-0, locking devices 1504-1, entertainment devices 1504-2 and security devices 1504-3, as but a few of many possible examples.

Gateway device 1502 and local devices (1504-0 to -3) can switch between channel and narrow band modes. Further, any such devices (1502, 1504-0 to -3) can issue clear signals (e.g., CTS-to-self) over channels, to ensure that potentially interfering channel signals are not transmitted while narrow bands are transmitted, and vice versa.

Operating networks at narrow band frequencies can provide great advantages over conventional networks, such as IEEE 802.11 wireless systems, that have a minimum channel bandwidth of 20 MHz. Narrow band signals can have greater range and consume less power. However, while narrow band communications can have significant benefits, they also have the potential to interfere with the signals in IEEE 802.11 wireless systems, and vice versa. According to embodiments, method can provide for better coexistence between a narrow band and channel (e.g., IEEE 802.11) wireless system.

According to embodiments, AP and STA devices can reserve a transmission channel, and thus protect a time window that can be used for narrow band transmissions. In some embodiments, such a reservation can include the transmission of a Clear To Send (CTS) control frame to themselves (CTS-to-Self). This reserved "air time" can help ensure that narrow band transmissions can be carried out without interfering with other channels (e.g., 20 MHz) STAs, and that STAs will not start transmitting across channels during narrow band transmissions.

While embodiments can execute channel communications according to any suitable protocol, in some embodiments such communications can be according to any suitable IEEE wireless standard, including but not limited to 802.11(a), 802.11(b), 802.11(g), 802.11(h), 802.11(ac) and/or 802.11 (ax). Further, embodiments can transmit across channels of any suitable wireless communication band, including but not limited to a 2.4 GHz band, 5.0 GHz band and/or 6.0 GHz band. Channels can have any suitable bandwidth size, including about 5 MHz, 10 MHz, 20 MHz, 40 MHz, 80 MHz and 160 MHz, with narrow bands having a smaller bandwidth than their corresponding channel(s).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   by operation of a first device, monitoring all of a first channel for a first monitoring period;
   after the first monitoring period, by operation of the first device, monitoring at least one narrow band for at least a first narrow band signal transmitted only in the at least one narrow band;
   in response to detecting the first narrow band signal,
   associating with an access point device (AP) with communications over the at least one narrow band, and
   establishing a subsequent narrowband transmit time with the AP,
   in response to a start of the established narrowband transmit time, transmitting a channel clearing signal across the first channel configured to prevent devices operating according to a first protocol from transmitting across the first channel; and
   establishing a network connection over the narrow band with the AP; wherein
   the at least one narrow band has a frequency range less than one half that of the first channel.

2. The method of claim 1, wherein:
   monitoring the first channel includes monitoring for packets transmitted according to an IEEE 802.11 wireless standard.

3. The method of claim 1, wherein:
   monitoring the first channel includes monitoring channels of no greater than about 20 MHz; and
   monitoring the at least one narrow band includes monitoring narrow bands no greater than 10 MHz.

4. The method of claim 1, wherein:
   monitoring the first channel includes monitoring for a first band beacon that includes at least a first beacon interval value for a first wireless protocol; and
   the first narrow band signal include at least one narrow band beacon that includes at least a first narrow band beacon interval value for a second wireless protocol.

5. The method of claim 1, further including:
   by operation of the AP, transmitting a channel clearing signal across the first channel configured to prevent devices operating according to a first protocol from transmitting across the first channel; and
   by operation of the AP, after transmitting the channel clearing signal, transmitting the at least one first narrow band signal on the at least one narrow band.

6. The method of claim 5, wherein:
   transmitting at least one first narrow band signal on at least one of the narrow bands includes the AP transmitting first narrow band signals on a plurality of different narrow bands.

7. The method of claim 1, further including:
by operation of the first device, dynamically switching between monitoring the first channel and the at least one narrow band in response to predetermined conditions.

8. The method of claim 7, wherein:
the predetermined conditions are selected from the group of: a data rate value for the first device; a power consumption setting for the first device; a command from a second device over at least one narrow band; and a communication status of a connection over the first channel.

9. The method of claim 1, wherein:
monitoring the first channel includes monitoring for first channel signals having the first modulation type; and
the first narrow band signal has the first modulation type.

10. The method of claim 1, wherein:
the channel clearing signal is a CTS-to-self type signal according to an IEEE 802.11 wireless protocol.

11. A device, comprising:
radio circuits formed in an integrated circuit substrate and configured to transmit and receive signals across a first channel and across at least one narrow band, the at least one narrow band having a frequency range less than half that of the first channel; and
communication circuits formed in the integrated circuit substrate and in communication with the radio circuits, configured to
  detect at least one first narrow band signal on only the at least one narrow band, and
  in response to detecting at least one first narrow band signal,
establishing a network connection with an access point device (AP) with signals transmitted across the at least one narrow band and not outside of the at least one narrow band, and
  establishing a subsequent narrowband transmit time with the AP;
  in response to a start of the established narrowband transmit time, transmit a CTS-to-self type signal according to an IEEE 802.11 wireless protocol configured initiate a predetermined time period in which devices operating according to the first protocol are prevented from transmitting across the first channel.

12. The device of claim 11, wherein:
the first channel has a frequency range of no greater than about 20 MHz; and
the at least one narrow band has a frequency range of no more than 10 MHz.

13. The device of claim 11, wherein:
the communication circuits include a clock circuit that selectively downclocks a base clock signal to generate a downclocked signal, wherein
the downclocked signal is used for transmissions in the at least one narrow band, and not used for transmission in the first channel.

14. The device of claim 11, wherein:
the radio circuits are further configured to use a same modulation type for signals transmitted across the first channel and signals transmitted across the at least one narrow band.

15. A system, comprising:
at least one station device configured to
  monitor a first channel for a first beacon signal,
  monitor at least one narrow band for a narrow band beacon signal transmitted only on the at least one narrow band if the first beacon signal is not detected,
  in response to detecting the narrow band beacon, associating with an access point device (AP),
  establishing a subsequent narrowband transmit time with the AP,
  in response to a start of the established narrowband transmit time, transmitting a channel clearing signal across the first channel configured to prevent devices operating according to a first protocol from transmitting across the first channel, and
  establishing a network connection by transmissions across the narrow band and not outside of the narrow band, wherein
  the narrow band has a frequency range less than half that of the first channel.

16. The system of claim 15, wherein:
the first beacon signal is a beacon transmitted according to an IEEE 802.11 wireless standard.

17. The system of claim 15, wherein:
the at least one station device is further configured to, after establishing the network connection over the narrow band, periodically monitor the at least one narrow band.

18. The system of claim 15, further including:
the access point device configured to
  transmit the first beacon signal,
  transmit the narrow band beacon signal, and
  associate with the at least one station device.

19. The system of claim 18, wherein:
the access point device is further configured to transmit a CTS-to-self type signal according to an IEEE 802.11 wireless protocol to initiate a time period in which devices operating according to a first protocol are prevented from transmitting across the first band.

20. The system of claim 19, wherein:
the access point device is further configured to transmit the narrow band beacon after the channel clearing signal.

21. The system of claim 19, wherein:
the at least one station device is configured to
  monitor the first channel for signals having a first modulation type, and
  monitor the at least one narrow band for signals having the first modulation type.

22. The system of claim 15, wherein:
the channel clearing signal is a CTS-to-self type signal according to an IEEE 802.11 wireless protocol.

* * * * *